Sept. 6, 1966     V. E. GLEASMAN ET AL     3,270,559

REMOTE METER READING DEVICE

Filed March 7, 1963     7 Sheets-Sheet 1

*INVENTORS*
VERNON E. GLEASMAN
CLAUDE H. GLEASMAN
BY Jack M. Young
ATTORNEY

Sept. 6, 1966  V. E. GLEASMAN ET AL  3,270,559
REMOTE METER READING DEVICE
Filed March 7, 1963  7 Sheets-Sheet 4

INVENTORS
VERNON E. GLEASMAN
CLAUDE H. GLEASMAN
BY
Jack M. Young
ATTORNEY

Sept. 6, 1966   V. E. GLEASMAN ET AL   3,270,559
REMOTE METER READING DEVICE
Filed March 7, 1963   7 Sheets-Sheet 5

INVENTORS
VERNON E. GLEASMAN
CLAUDE H. GLEASMAN
BY
Jack M. Young
ATTORNEY

Sept. 6, 1966  V. E. GLEASMAN ET AL  3,270,559
REMOTE METER READING DEVICE
Filed March 7, 1963  7 Sheets-Sheet 7

INVENTORS
VERNON E. GLEASMAN
CLAUDE H. GLEASMAN
BY Jack M. Young
ATTORNEY

United States Patent Office 3,270,559
Patented Sept. 6, 1966

3,270,559
REMOTE METER READING DEVICE
Vernon E. Gleasman, 3808 Kirkwood Road, Cleveland Heights, Ohio, and Claude H. Gleasman, West Leyden, N.Y.
Filed Mar. 7, 1963, Ser. No. 263,575
17 Claims. (Cl. 73—272)

The present invention relates to a remote meter reading device, and especially to a device for permitting reading outdoors the total quantity of water metered, as registered on a water meter located indoors.

A water meter, used for measuring water purchased from a public utility, must be located inside a building to protect it from freezing during the winter time. It has been determined that each water meter reader man can read many more water meters per day, and thus reduce the cost of the water to the consumer, if each meter to be read could be located outside so that the meter reader would not have to enter the house or other building. The remote meter reading device disclosed herein is especially adapted for making such outside meter reading possible.

An object of this invention is to provide a remote meter reading device having a transmitter unit at the meter at one location for sending a signal to a signal receiver unit at another location indicating thereat the meter reading.

A further object of the present invention is to provide a remote meter reading device for indicating outside a building the reading of a meter, such as a water meter, located inside thereof.

A further object of the present invention is to provide a remote meter reading device operable by a pulse-type signal—such as electricity; a reciprocated flexible shaft, string of spherical balls, or column of liquid; etc.

A further object of the present invention is to provide a remote meter reading device having means for counterbalancing the static-head pressure in a reciprocated, column-type, signal transmission means.

A further object of the present invention is to provide a remote meter reading device characterized by its inexpensive manufacturing cost, ease of assembly of its component parts, structural simplicity, compactness in disassembly for shipping, strong and sturdy nature, operating efficiency, ease of operation or use, low operating cost, silent operation, low maintenance cost, accuracy of operation, and/or opportunity to provide substantial cost saving.

These and other objects of the present invention will become more fully apparent by reference to the appended claims as the following detailed description proceeds in reference to the accompanying drawings wherein:

Figures 1, 2, 3, 4, 11, 12:
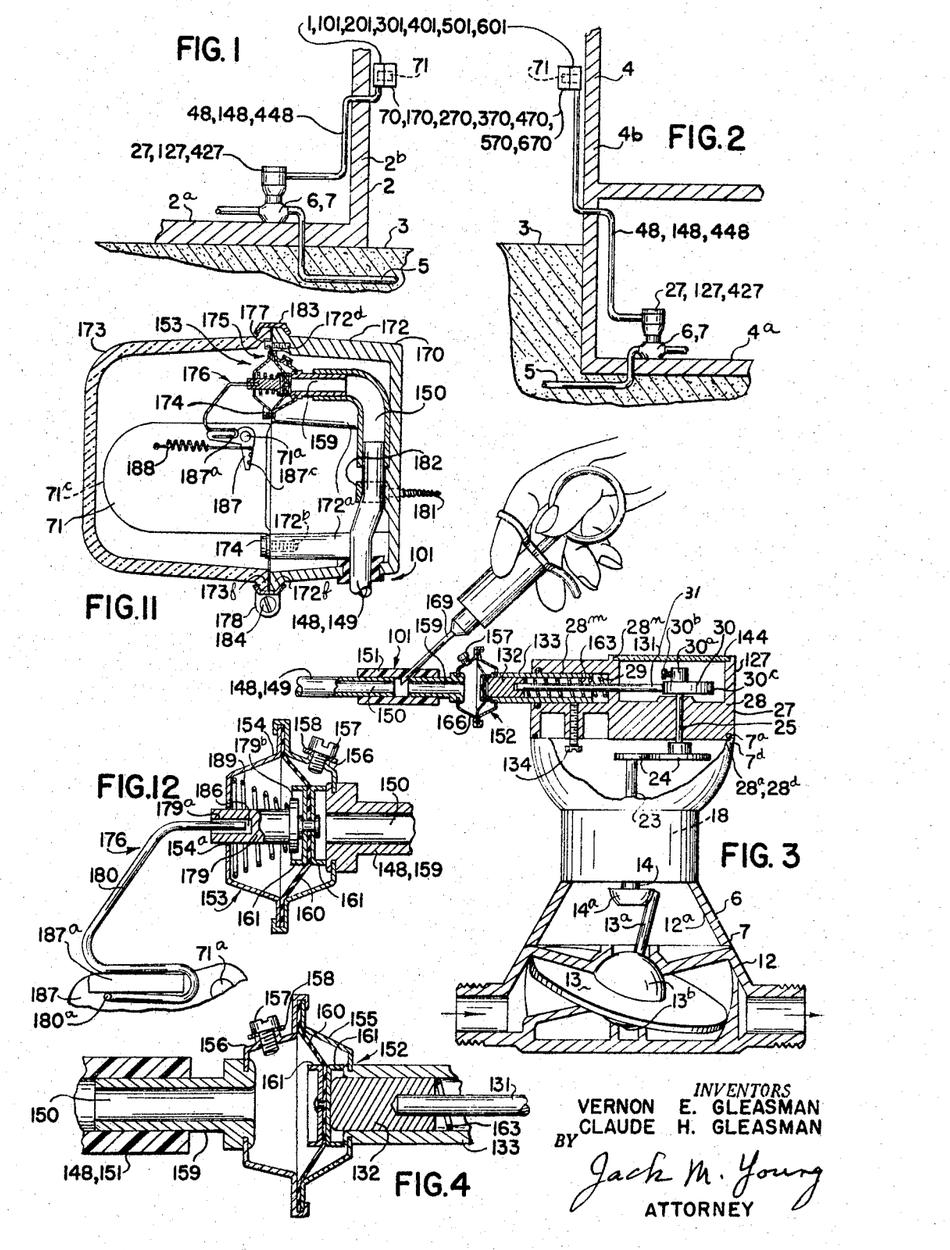
FIG. 1 is a vertical sectional view through a slab-type house, having no basement, but having the remote meter reading device described herein installed therein.
FIG. 2 is a view similar to FIG. 1 but through a house having a basement and with the water meter installed in the basement thereof.
FIG. 3 is a vertical sectional view through a water meter, a transmitter unit, and a portion of a signal transmitting element in one form of the remote meter reading device shown in FIGS.1 and 2.
FIG.4 is an enlarged view of the upper left hand portion of FIG. 3.
FIG. 11 is a vertical sectional view through a receiver unit and a portion of the transmitting element in one form of the invention shown in FIGS. 1 and 2.
FIG. 12 is an enlarged view of the upper central portion of FIG. 11.

This invention is generically shown in FIGS. 1 and 2. It relates to remote meter reading device 1 especially adapted to be used with water meter 6 in FIG. 1 or 2, located indoors, so as to permit reading of the meter outdoors on receiver unit 70. However, it will be apparent that this device 1 has other uses and may be used for reading at a distance other meters or mechanisms.

The reason for the location of the component elements in FIGS. 1 and 2 is that water meter 6 must be protected from freezing by being located within the building. If it were located outside, it would freeze during the winter time.

There are many advantages in using remote meter reading device 1, shown in FIGS. 1 and 2 and disclosed in more detail in FIGS. 3–35 hereafter.

The outstanding advantage is that it reduces the cost of water to the consumer because it reduces the operating cost of the public utility. It has been estimated that each water meter reading man can only read 130–170 meters 6 per day when they are located within the building; but can read 600–675 meters per day when reading meter counting register 71 in receiver unit 70 is located outside the building. The increased time required for meter reading inside each house is caused by the necessity for the meter reader to ring the doorbell of the house, to wait for the doorbell to be answered, to identify himself to the housewife, to gain admittance, to walk down into the basement or other area where the meter is located, to read the meter (sometimes difficult to read because it is located in a dimly lit area), to return to the outside, and to repeat the process at the next house. If the housewife is not at home, it is necessary either to call again or to estimate the meter reading. In contrast, receiver units 70 on adjacent houses can be located facing each other, as shown in FIGS. 1 and 2, so that the meter reader need merely make one stop for every two houses and need not take time to enter any house. It has been estimated that, in only one large city having over 300,000 households, installation of remote meter reading devices 1 will save $250,000 per year in meter reading and bookkeeping costs. This savings would naturally be passed on to the consumer in a lower water bill.

If all receiver units 70 for a street of houses were located in a panel board at the corner of the street, even a greater number of meters could be read per day and even greater savings could be obtained because the meter reader would have to make only one stop for the whole street of houses.

Remote meter reading device 1 also has other advantages. It eliminates the inconvenience of having a meter reader disturb each housewife by entering her house each month; it provides accurate translation of meter reading from meter 6 to receiver unit 70; and it has a self-contained construction, simplicity of operation, tamper-proof construction, long wear life, minimum maintenance cost, inexpensive and easy installation, low initial cost, silent operation, the ability to transfer each individual unit of water measurement from the base of meter 6 for recording individually on counting register 71, etc.

FIGS. 1 and 2 show two conventional type residential homes or buildings, including a slab-type house 2 in FIG. 1 having slab floor 2a laid on ground 3 and having side wall 2b; and basement-type house 4 in FIG. 2 having basement floor 4a and side wall 4b. Such houses frequently have conventional water meter 6 located inside building 2 or 4 for measuring the quantity of water supplied through pipe 5 to the building by a public utility and used within the building.

Figures 27, 28, 31:
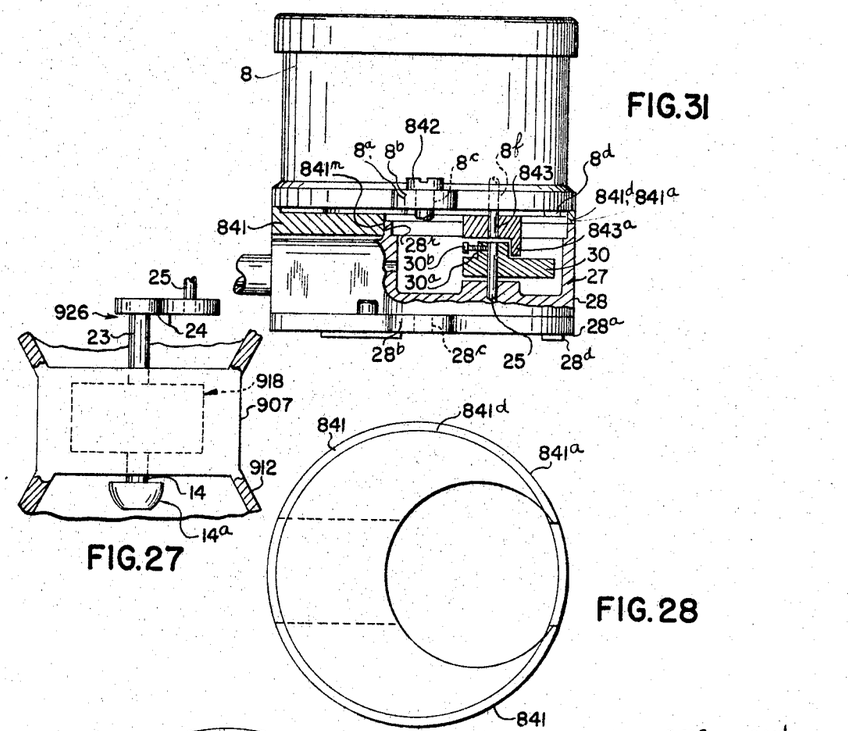
FIGS. 28, 29 and 30 are respectively top, side and bottom views of the test adaptor in FIG. 31 adapted to be mounted on the transmitter unit housing in FIG. 3 or 19.
FIG. 31 is a side elevational view, partially in vertical section, of the test adaptor sandwiched between the transmitter unit housing in either FIG. 3 or FIG. 19 (on the bottom) and a water meter head (on the top), which head was earlier removed from the water meter base in FIG. 3 or 19 before installation of the transmitter unit housing thereon, and wherein the transmitter unit housing is shown with the cam follower, switch or actuated part in FIG. 3 or 19 removed.
Figure 29:
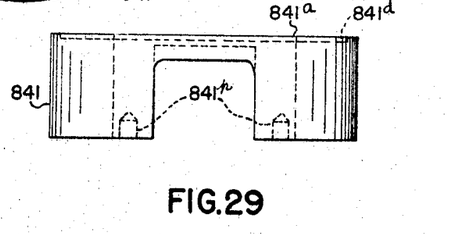
Figure 30:
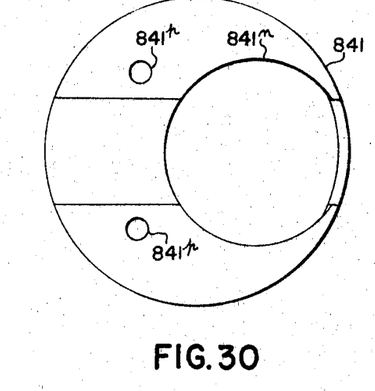
Figure 34:
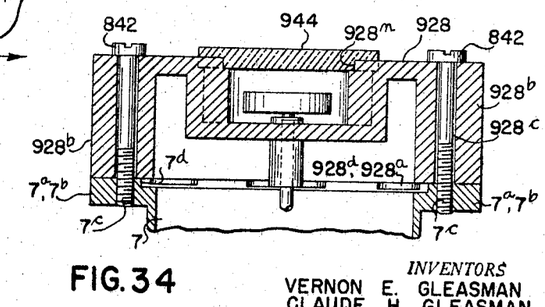
Figure 35:
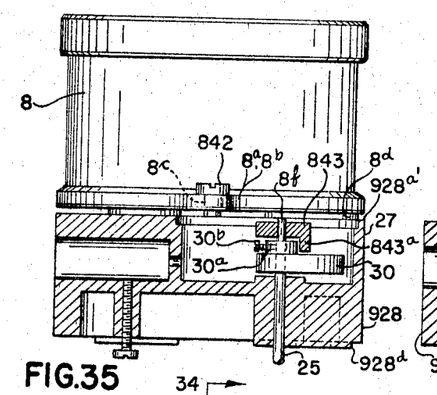
FIG. 35 is a side elevational view, partially in vertical section, of the transmitter unit housing in FIG. 33 with the conventional water meter metering head secured to the top thereof, which metering head was earlier removed from the water meter base in FIG. 3 or 19.

This conventional type water meter 6 generally includes water meter volumetric measuring base 7 in FIG. 3 (sometimes also called a water meter hereafter) and a register metering head 8, shown only in FIGS. 31 and 35 as detached from base 7 and having a series of water meter dials on the top thereof (not shown) indicating the amount of water used, joined together in the conventional manner not here illustrated. Base 7 and head 8 are usually joined together by base connector 7a on base 7 in FIG. 34 and head connector 8a on head 8 in FIGS. 31 and 35. These connectors generally include telescopically assembled female recess 7d in FIGS. 3, 19 and 34 and male alignment ring 8d in FIGS. 31 and 35, diametrically aligned ears 7b and 8b with one hole 8c in each ear 8b axially aligned with one threaded hole 7c in each ear 7b, and suitable aligning means, such as two screws, with each inserted through one hole 8c and then screwed into its aligned threaded hole 7c to secure together base 7 and head 8.

Conventional water meter volumetric measuring base 7 in FIG. 3 includes housing 12 having circular metering chamber 12a with a conical roof and a floor divided into equal compartments by a water meter, volumetric measuring, wobble plate or nutating disc 13. Disc 13 does not rotate about its own axis, but shaft 13a on disc 13 generates during its rotation a cone with its apex extending downwardly. Motion of disc 13 is guided by two half balls 13b mounted thereon. With each complete revolution of disc 13, a fixed volume of water passes through chamber 12a in the direction of the arrows in FIG. 3 and is measured by rotation of water quantity measuring shaft 13a. This circular motion of the upper end of disc shaft 13a rotates shaft 14, rotatably mounted in housing 12, by the driving contact between shaft 13a and head 14a by shaft 13a held in a peripheral notch in head 14a, located on the lower end of shaft 14. Rotation of shaft 14 drives shaft 25 through any suitable drive unit 18 (not shown but having at least one gear reduction) located inside housing 12, output shaft 23, and reduction gears 24 connected to the water meter output shaft 25 (which shaft is also the drive shaft of transmitter unit 27 and is rotatably mounted in transmitter unit housing 28 in FIG. 3) rotatably responsive to and rotated generally proportional to the quantity of water measured by wobble plate 13. When meter base 7 and meter head 8 are secured together in the aforedescribed conventional manner, right hand gear 24 in FIG. 3 is secured to and drives meter head shaft 8f in turn driving the water meter dials (not shown) in head 8 in FIGS. 31 and 35 indicating the amount of water used.

Remote meter reading device 1 in FIG. 3 has transmitter unit 27 mounted on and secured to water meter base 7 in place of head 8, receiver unit 70 located on the outside of either building side wall 2b in FIG. 1 or building side wall 4b in FIG. 2 in a place for easy and convenient reading on its counting register 71 outside the building of the total quantity of water supplied through pipe 5 and used within the building, and signal transmitting element 48 in FIGS. 1 and 2 connecting transmitter unit 27 and receiver unit 70 for transmitting a signal therebetween.

Transmitter unit housing 28 of transmitter unit 27 has connector 28a coupled to connector 7a on base 7 in the same manner as connector 8a has been previously coupled. Connector 28a has male alignment ring 28d telescoped into female recess 7d and has diametrically aligned ears 28b in FIG. 31, each having a hole 28c therein for securement to threaded hole 7c by the same connector screw or other aligning means. Note in FIGS. 5 and 6 that the top surface of housing 28, located remote from base 7, is of minimum thickness and is shaped differently than base connector 7a because it has no structure comparable to either diametrical ears 7b or female recess 7d. Housing 28 also includes in FIGS. 3, 5–7 or 19 boss 28f, hole or socket 28n, posts 28p, circular boss 28r and bore 28m to be discussed in more detail hereinafter.

Although water meter 6 with base 7 has been illustrated in device 1, it should be readily apparent that any suitable type meter may be used with any suitable base. Meter 6 may take the form of any type meter, such as a fluid meter for liquid, water, gas, chemical, etc. Movement of any suitable actuating member in any suitable signal generating means 29 can be used for causing transmitting unit 27 to transmit a signal with this actuating member taking the form of either shaft 25 described in the next paragraph or any flow measuring reciprocating piston, diaphragm, etc. (not shown but of conventional construction) used in place of wobble plate 13 either drivingly connected to move reciprocating member 31 or diaphragm 160 in FIG. 4 or serving also as this diaphragm 160, as will be more apparent hereinafter.

Transmitter unit 27 includes signal generating means 29 responsive to the water quantity measured by rotation of shaft 25 for periodically transmitting an impulse as a signal by transmitting element 48 in FIGS. 1 and 2 to counting register 71 for recording the total quantity of water measured on this energized, impulse actuated counting register 71. Transmitter unit 27 includes cam 30 in FIG. 3, secured by set screw 30b in cam hub 30a to (and rotatable with) drive shaft 25, and means (including cam follower 31 in FIG. 3) actuated by cam periphery 30c of cam 30 for generating this impulse. This cam actuated construction is not only silent in operation but also has another advantage because the energy absorbed from drive shaft 25 during travel of cam follower 31 along the uphill portion of cam periphery 30c is returned to drive shaft 25 during travel of cam follower 31 along the downhill portion of cam periphery 30c. Device 1 transmits each "unit" measurement of water from meter output shaft 25 to be recorded on counting register 71 because an impulse signal is transmitted by cam actuated signal generating means 29 upon each rotation of output shaft 25 through signal transmitting element 48, extending through housing bore 28m, to register 71.

Counting register or counter 71 may be of any conventional counter construction. One example thereof is a counter disclosed in U.S. Patent No. 2,272,478 issued Feb. 10, 1942, to F. A. Poole and entitled "Counting Device" wherein shaft 21, arm 23 and window 41 in said patent correspond respectively with shaft 71a, arm 71b and/or counter wheels window 71c in FIGS. 11, 12, 14–17, 21 and 22 in the present application, whichever is appropriate.

It will be apparent hereinafter that the description of the structure and mode of operation given in the preceding paragraphs for FIGS. 1–13 also applies generically to the same named or numbered parts and modes of operation shown in FIGS. 14–16, 17 and 18–25 for other forms of the present invention, including device 101, 201, 301, 401, 501 or 601; transmitter unit 127 or 427; signal transmitting element 148 or 448; receiver unit 170, 270, 370, 470, 570 or 670; etc.

Any one remote meter reading device 1 includes only the aforedescribed components 7, 27, 48 and 70. The aforedescribed parts having reference numerals less than 100 are intended to be generic to all forms of the device described hereafter wherein the same reference numeral is used but of a different hundred series for each different species. Many variations in structure of each of these components are described hereafter, and these components may be combined in many different ways into many different combinations. For example, any of the following combinations are intended to be within the scope of the present invention:

(1) Device 1 in FIGS. 1 and 2 taking the form of non-electric, remote meter reading device 101, 201, or 301 in FIGS. 1 and 2 including:

a. Transmitter unit 27 in FIGS. 1 and 2 taking the form of transmitter unit 127 in FIGS. 3 and 4.
b. Signal transmitting element 48 in FIGS. 1 and 2 taking the form of signal transmitting element 148 in FIGS. 3, 4, 11 and 12 using therein any one of the following signals transmitting means 150:
  1. Liquid 150′ in FIG. 8,
  2. Balls 150″ in FIG. 9, or
  3. Flexible shaft 150‴ in FIG. 10, and
c. Receiver unit 70 in FIGS. 1 and 2 taking the form of either:
  1. Receiver unit 170 in FIGS. 11, 12 and 13 in device 101 in FIGS. 1 and 2, or
  2. Receiver unit 270 or 370 in FIGS. 14–16 in device 201 or 301 in FIGS. 1 and 2 having the drive shown respectively either in FIGS. 15 and 16 for unit 270 or in FIG. 17 for unit 370.

Figures 18, 19, 20:
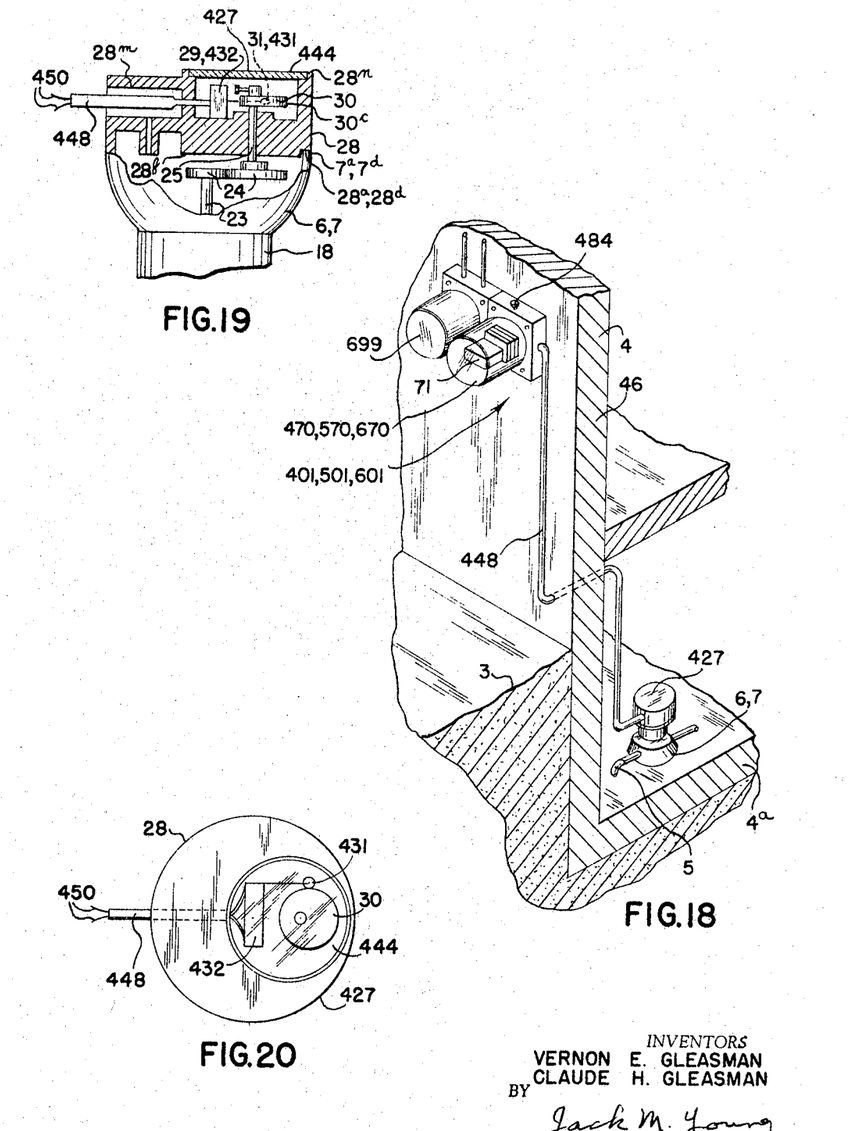
FIG. 18 is a perspective, sectional view of the structure shown in FIG. 2 with an electric-type remote meter reading device being specifically illustrated as another form of the device shown in FIGS.1 and 2.
FIG. 19 is a vertical sectional view, similar to FIG. 3, but through the coupled transmitter unit and water meter base in FIG. 18.
FIG. 20 is a top plan view of the transmitter unit in FIG. 19.

(2) Device 1 in FIGS. 1 and 2 taking the form of an electric remote meter reading device 401, 501 or 601 in FIGS. 1, 2 and 18 including transmitter unit 27 in FIGS. 1 and 2 taking the form of transmitter unit 427 in FIGS. 18, 19, 20 and 21; signal transmitting element 48 in FIGS. 1 and 2 taking the form of signal transmitting element 448 in FIGS. 18, 19, 20 and 21; and receiver unit 70 in FIGS. 1 and 2 taking the form of receiver unit 470, 570 or 670 respectively in FIGS. 18 and 21–23 powered either:

a. By solar cells 599 and batteries 598 in FIG. 24 in device 501, or
b. By watt hour meter 699 and transformer 698 in FIG. 25 in device 601.

Figures 5, 6, 7, 8, 9, 10, 13, 26:
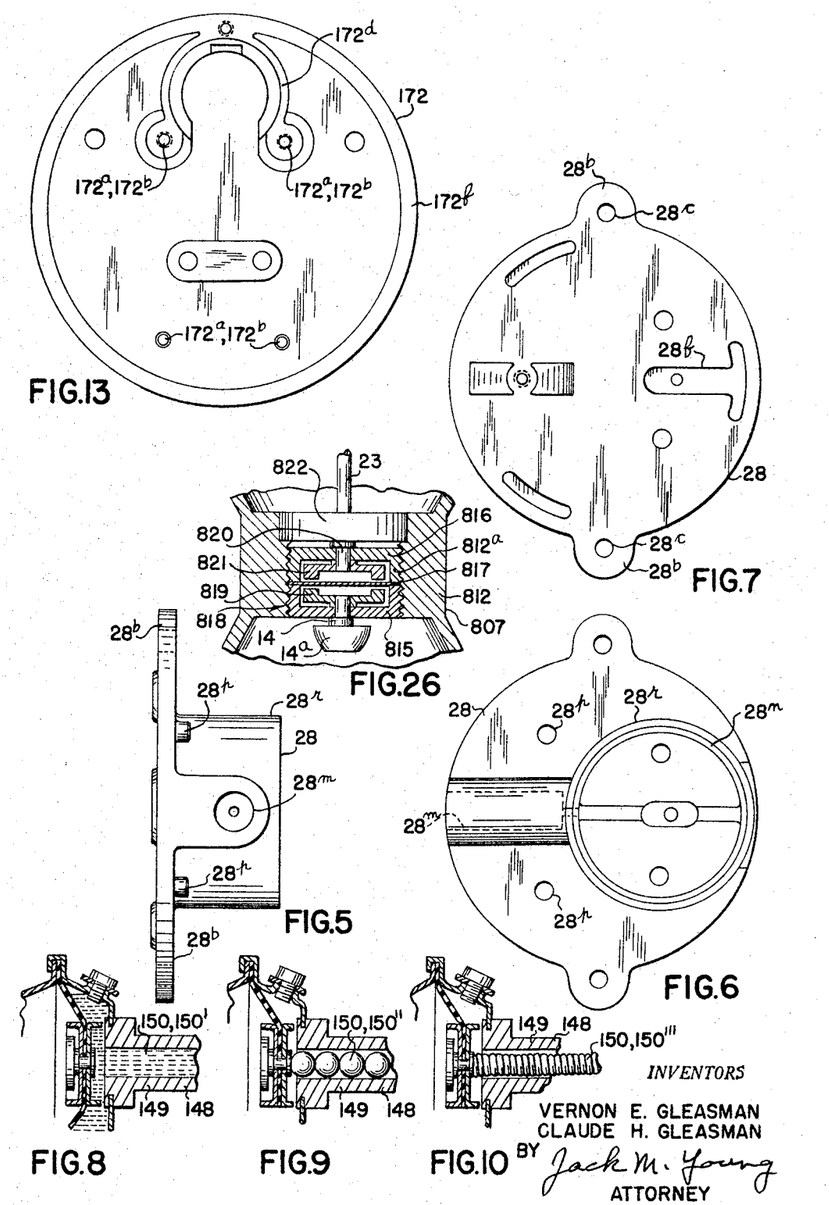
FIGS. 5, 6 and 7 are respectively side, top and bottom views of the transmitter unit housing mounted on top of the water meter base in FIG. 3.
FIGS. 8, 9 and 10 are vertical sectional views of the right hand portion of FIG. 12 showing different forms of signal transmission means useable in FIGS. 3, 11, and 14–17 and comprising respectively a liquid column, a string of spherical balls and a flexible shaft.
FIG. 13 is a view, taken from the left, of the receiver unit base in FIG. 11.
FIGS. 26 and 27 are view of different forms of driving mechanisms adapted to be used in the assembled water meter and transmitter unit shown in FIG. 3 or 19.

(3) In water meter base 7 in FIG. 3 or 19, drive unit 18 can take the form of either drive unit 818 in FIG. 26 or drive unit 918 in FIG. 27.

(4) Each transmitter unit 127 and 427 may have different forms of housings and other assembled components. Housing 28 in FIGS. 3, 5, 6, 7, 19 and 20 is one form used in the assembly shown in FIGS. 3 and 19 for illustrative purposes but housing 28 shown in FIGS. 3 and 19 may be easily replaced in FIG. 3 or 19 by any of the following:

a. Assembled together housing 28 in FIGS. 5, 6 and 7 and adapter 841 in FIGS. 28, 29 and 30 with or without metering head 8 shown assembled on housing 28 and adapter 841 in FIG. 31;
b. Housing 928 shown in FIGS. 32, 33 and 34; or
c. Assembled together housing 928 and metering head 8 shown in FIG. 35.

The above forms of the invention will be generally described in detail hereafter in the same sequence as above briefly described.

It will be apparent hereinafter that any of the above described assemblies will provide a remote meter reading device 1 having generally the same mode of operation as earlier broadly described.

Hereafter a description of the component parts, structure, mode of operation and advantages will be given at any one time for only one form, or only one of the above components, of the invention, but applicants will try to state whenever this same description applies generically to the correspondingly named and numbered parts in another form or component of the invention having either the same reference numerals or the same reference numerals except in a different hundred series.

The structural differences between these different invention forms will be brought out hereafter.

Transmitter unit 127 is shown in detail in FIGS. 3 and 4. Signal generating means 29 therein includes coupled together cam follower, plunger shaft or pin member 131 and plunger pilot 132 telescopically supported, for endwise movement by cam 30, in diaphragm shell support tube 133 secured against endwise movement in transmitter unit housing 28 by tightening screw 134.

FIGS. 1, 2, 3, 4, 8, 9, 10, 11, 12, 14 and 15 show signal transmitting element 148. Element 148 includes tube 149 (preferably a metal tube formed of a work-hardenable metal) so that any unauthorized pinching of tube 149, for making remote meter reading device 101 inoperative by cutting off the signal to receiver unit 170, will be visibly apparent.

Any suitable signal transmission means 150 may be located, and be movable endwise, within tube 149. This means 150, in response to rotation of water meter output shaft 25, actuates counting register 71 by transmitting a signal from its transmitting head 152 in FIG. 3 to its receiver head 153 in FIG. 11, secured to and operatively connected to opposite ends of tube 149.

Signal transmitting means 150 may take any of various forms, including:

(1) a column of liquid 150′ in FIG. 8;
(2) a string of spherical balls 150″, such as ball bearings in FIG. 9; or
(3) a motion transmitting flexible shaft 150‴ located within tube 149 in FIG. 10. Liquid 150′ is preferably a non-freezing liquid having minimum thermal expansion, such as brake fluid, hydraulic fluid, ethylene glycol, etc. hermetically sealed within tube 149.

Signal transmitting element 148 includes two heads 152 and 153 in FIGS. 4 and 12 secured to opposite ends of tube 149. Transmitting head 152 receives an impulse or signal from transmitter unit 127, head 152 transmits this impulse or signal received from unit 127 through signal transmitting means 150 in tube 149 to receiver head 153, and head 153 actuates counting register 71 in unit 170, as will be apparent hereinafter.

Each head 152 and 153 has in FIGS. 4 and 12 common construction, including two diaphragm support shells 154, 156 in FIG. 12 or 155, 156 in FIG. 4 joined by a spun peripheral seam securing therebetween flexible diaphragm 160 having its center portion secured in sandwiched relationship between diaphragm center pilots 161, 161. Each shell 156 has screwed therein bleedscrew 157 having sealing washer 158 thereon and has diaphragm shell nipple 159 adapted to be suitably secured to one end of tube 149.

Rubber tube 151 can be used to connect tube 149 and nipple 159 in FIGS. 3 and 4 by Pliobond cement, or the equivalent.

Transmitting head 152 has in FIG. 3 diaphragm shell support tube 133 secured to shell 155 by a swaged connection and is held in any selected telescoped relationship in bore 28m in housing 28 by tightened support tube screw 134 so as to locate counterbalance springs 163 between plunger pilot 132 and the bottom of bore 28m.

It should now be apparent that cam 30 on driveshaft 25 exerts during rotation an oscillating force on diaphragm 160 in transmitting head 152 as a signal, and the pulsations of this diaphragm 160 in transmitting head 152 will carry this signal through any of the signal transmitting means 150 in FIGS. 8, 9 and 10 to pulsate synchronously diaphragm 160 in receiver head 153. This signal actuates a suitable drive means to actuate counting register 71 in response to the oscillating force exerted by diaphragm 160 in receiver head 153, as will be described in more detail hereafter. These slow moving, precision parts will show no wear even after years of use and will accurately register this signal on outside register 71, as will be apparent hereinafter.

Preassembly of the components of device 101 is not required. The separate components (including transmitter unit 127, received unit 170, signal transmitting element 148) are separately formed and then are subsequently easily and quickly assembled together during installation of device 101 on building 2 or 4. These component parts are separately provided and then assembled at the installation site. Units 127 and 170 are detachably secured to opposite ends of transmitting element 148 to complete the assembly at the site. It will be apparent hereinafter that the description in this paragraph applies equally well to the construction shown not only in FIGS. 3–13 but also to the correspondsly named and numbered parts in the 200, 300, 400, 500 and 600 series in FIGS. 14–25. Assembly is completed in FIGS. 18–25 by detachably connecting opposite ends of wires 450 in element 448 to suitable terminals in unit 427 and in unit 470, 570 or 670; and in FIGS. 3–17 by locating tube 133 in FIG. 3 within transmitter unit bore 28m and securing it therein by screw 134 and by securing receiver head 153 at the other end in either receiver unit 170 by screws 174 and 175 or receiver unit 270 or 370 by screws 275.

During this assembly, it is desirable to make suitable adjustment when receiver unit 170 is located higher than transmitter unit 127, as shown in FIGS. 1 and 2. This adjustment will: (1) counterbalance the static-head-pressure of the weight of signal transmission means 150, such as fluid 150′ in FIG. 8, in signal transmission unit 148 when receiver unit 170 is located higher than transmitter unit 127, and (2) assure that rotation of shaft 25 and cam 30 in transmitter unit 127 does not have to work against a high head pressure, such as in the installation in FIG. 2, so as to cause high resistance necessary to be overcome by water driven disc 13. This counterbalancing action is provided by spring member 163 and pin member 131 interposed between cam periphery 30c and diaphragm 160 in transmitting head 152 in FIG. 3. The length of the pin and the counterbalancing force of the spring are so chosen that: (1) spring 163 counterbalances the static-head-pressure of signal transmission means 150, and (2) cam 30 does not have to work against this static-head-pressure. If a drippy faucet occurs so that wobble plate 13 moves very slowly, counterbalancing spring 163 prevents overloading of wobble plate 13 by this static-head-pressure so that accurate water flow measurement is always obtained.

It is desirable to be able to adjust manually this counterbalancing force to compensate for differences in length of members 131 and 163, in the required counterbalancing force, and/or in the static-head-pressure not only in slab-type house 2 in FIG. 1 but also in basement-type house 4 in FIG. 2, the two more common type houses encountered. This is achieved herein by having pin member 131 come in several different lengths, such as two lengths, with one for the FIG. 1 construction and one for the FIG. 2 construction for counterbalancing the two different head pressures involved. When the shorter pin member is used, tube 133 is inserted farther into bore 28m, by its axial telescopic connection, so as to compress spring member 163 a greater amount. Locking tube 133 in this position by tightening screw 134 will retain this selected, spring, static-head, counter-balancing pressure. It should be readily apparent that a range of counter-balancing pressures are obtainable with the same pin 131 by locating tube 133 at different axial depth positions in bore 28m while using the same spring 163. The structure provides not only a simple connection but also static-head-pressure adjustment by simple endwise movement of tube 133.

Tube 149 is easily filled with liquid 150′ in FIG. 8 by following these steps. Open upper and lower bleedscrews 157 in FIGS. 3, 4, 11 and 12; insert hypodermic needle 169 in FIG. 3, containing liquid 150′, into the soft rubber of rubber tube 151 connecting the lower end of tube 149 to nipple 159 in transmitting head 152 at transmitter unit 127; insert liquid 150′ into tube 149 by pushing the plunger in hypodermic needle 169 until liquid 150′ begins to flow out the port at bottom bleedscrew 157 adjacent lower unit 127 in FIGS. 3 and 4 to indicate that the air has been expelled from the lower end of tube 149, etc; tighten this lower bleedscrew 157; continue to fill tube 149 with liquid 150′ until it overflows out through the port at upper bleedscrew 157 adjacent upper unit 170 in FIGS. 11 and 12 to measure automatically the desired volume of liquid 150′ therein; tighten this upper bleedscrew 157; and subsequently withdraw hypodermic needle 169 from tube 151 so that the soft, self-sealing rubber of tube 151 will seal the hole previously formed in tube 151 by needle 169. Tube 151 provides an inexpensive type of tube connector and an inexpensive type of filler mechanism eliminating T's and filler valves. Now, a solid, accurately measured and hermetically sealed hydraulic column of liquid 150′ of proper level is located in tube 149 between diaphragms 160 in heads 152 and 153 with no gas entrapped therein. Liquid 150′ is now hermetically sealed within tubes 149 and 151.

Device 101 is inexpensive to assemble and install. Only one trade union is required, namely plumbers usually found working for every water department. Electricians or other trades are not required. The assembly cost is inexpensive because all three components 127, 148 and 170 are assembled at the time of installation on the building so as to keep the total cost down to a minimum.

An inspection of the drawings will reveal that the description of the structure and mode of operation for FIGS. 3–13 in the preceding paragraphs apply equally well to the same named parts and mode of operation in FIGS. 14–17.

Three different receiver units are illustrated: Unit 170 in FIGS. 11, 12 and 13; unit 270 in FIGS. 14, 15 and 16; and unit 370 in FIGS. 14, 15 and 16 but with the drive in FIG. 17 substituted for the drive in FIGS. 14–16 to counting register 71. Transmitting unit 127 and signal transmitting element 148 are usable with any of these receiver units and form in combination with units 170, 270 and 370 the designated respective remote meter reading devices 101, 201 and 301 in FIGS. 1 and 2.

Figure 21:
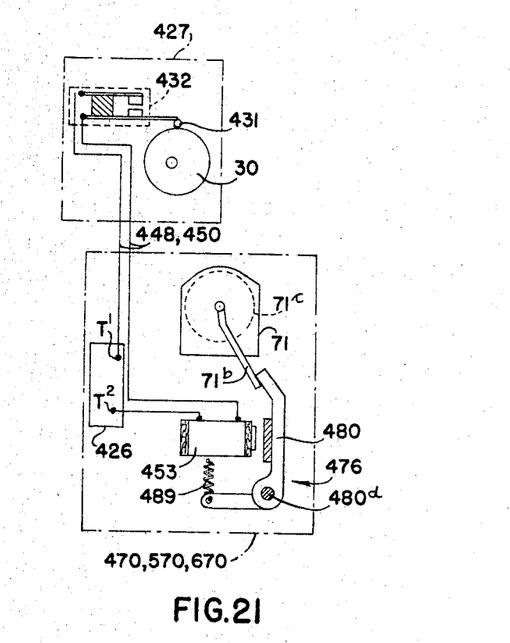
FIG. 21 is a schematic drawing of the electrical circuit adapted to be used in FIGS. 18–23, inclusive.
Figure 22:
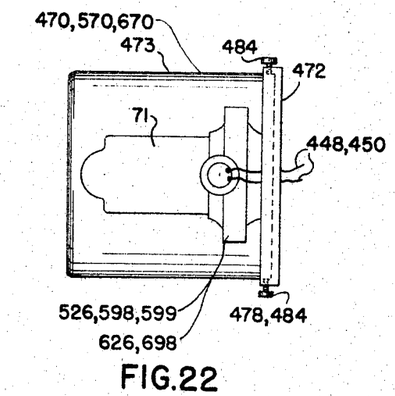
FIG. 22 is a side elevational view of the receiver unit in FIGS. 18 and 23.
Figure 23:
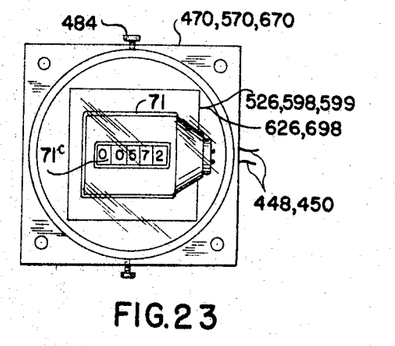
FIG. 23 is a front view of the receiver unit in FIGS. 18 and 22.

FIGS. 11–13 have some construction features similar to those in FIGS. 14–17 and in FIGS. 21–23. In FIGS. 11–13, unit 170 receiver unit base 172 having transparent member 173 detachably secures to base 172 by securement means 178. Transparent member 173 covers register 71, housed in unit 170 so that its counter wheels in window 71c are covered by but are readable from the outside by being visible through counter window 71c and transparent member 173, preferably formed of Lucite or plexiglass. If desired, indicia can be printed on the inner face of transparent member 173 for coacting with the indicia on the counter wheels on counter register 71. Receiving head 153 of signal transmitting element 148 actuates drive means 176 operatively connecting head 153 in element 148 and counter operating shaft 71a in counter or register 71 for actuating counting register 71 once in response to each oscillation of the oscillating force received by receiving head 153. An inspection of the drawings will reveal that the structure and mode of operation described in this paragraph also applies generically to the corresponding numbered parts and modes of operation in a different hundred reference number series in FIGS. 14–17 and 21–23.

FIGS. 11–13 have, as described in the next five paragraphs, construction features similar to those in FIGS. 14–17.

In FIGS. 11–13, base 172 is cup-shaped and is preferably formed as a plastic molding with injection molding core pins forming hollow mounting posts 172a with threaded holes 172b for register mounting screws 175. Transparent member 173 covers the open mouth of this cup-shape.

Register 71 is secured by screws 174 in threaded holes 172b to base 172.

Receiving head 153 is detachably connected to base 172 by securement means 175. The peripheral seam of receiving head 153 of signal transmitting element 148 is secured to base 172 by securement means 175, comprising screw 177 and some of the screws 174 screwed into threaded holes in base 172 with the screw heads thereof pulling head 153 down against base 172.

Drive means 176 includes reciprocable plunger 179 engaging on one end against diaphragm center pilot 161 in diaphragm 160 in receiving head 153, operatively connected for actuating counting register 71, being guided during its reciprocating movement by a loose telescopic fit in central hole 154a in diaphragm support shell 154, and engaging at its other end resilient arm 180 operatively connecting plunger 179 and counting register 71 to actuate register 71 by the signal received with arm 180 being yieldable by its resiliency in response to any overtravel of this signal beyond the signal required to actuate register 71.

Suitable construction is generally required to allow for the differential thermal expansion between liquid 150' in FIG. 8 and metal tube 149, as will be described hereafter.

However, no such allowance is required when using metal spherical balls 150'' or metal flexible shaft 150''' because the metal therein, being similar to the metal in tube 149, provides no differential thermal expansion. Since signal transmitting means liquid 150' is a very long column through tube 149, thermal expansion (if not allowed for) may cause problems. Allowance for thermal expansion in the usual installation in FIG. 1 or FIG. 2 needs to be made for less than the 4–5 feet of tube 149 exposed outside the building and affected by variations in temperature in FIGS. 1 and 2. The major portion of tube 149 is located within the building and is not normally subjected to these same large variations in temperature. These problems are solved by using clearance gap 186 at one end of, and adequate resiliency in, spring 180. Gap 186, located in drive means 176 between head 179 and register 71, allows for thermal expansion of signal transmitting means liquid 150'. A gap 186 of $\frac{1}{16}$'' length set at room temperature has been found satisfactory in buildings 2 and 4 in FIGS. 1 and 2 when metal tube 149 has a $\frac{5}{32}$'' outside diameter with a $\frac{1}{32}$'' thick wall. This permits operation from a sub-zero outside temperature to in excess of 120° F. outside temperature. Above room temperature, gap 186 is closed and some of the expansion is taken up by the resiliency in arm 180. Below room temperature, fluid 150' contracts until diaphragm 160 in FIG. 12 in receiver head 153 has one of its center pilots 161 bottom-stopped against nipple 159. Then, upon further reduction in temperature, diaphragm 160 in FIG. 4 is transmitting head 152 is pulled to the left from the position shown in FIG. 3 so that spring 163 pulls pin member 131 away from cam periphery 30c but not sufficiently far so that the lobe on cam periphery 30c cannot cause diaphragm 160 in receiver head 153 in FIG. 12 to reciprocate sufficiently to actuate counting register 71. This construction eliminates any need for a liquid accumulator either adding or removing liquid from tube 149 upon differences in temperature. The assembly is constructed so that arm 180 yields, at higher temperatures, in response to over-travel of diaphragm 160 in FIG. 12 beyond the signal required to actuate register 71.

An inspection of the drawings will reveal that the structure and mode of operation described in the preceding five paragraphs also applies generically to the corresponding numbered parts and modes of operation in a different hundred reference numbers series in FIGS. 14–17.

FIGS. 11–13 have some structural differences not found in the other receiver units.

Securement means 178 includes circumferential band 183 straddling flanges 172f and 173f respectively on base 172 and transparent member 173, and having its ends pulled together by tangential screw 184.

In FIG. 11, U-shaped tubing clamp 182 secures tube 149 against the bottom wall of base 172 by two, horizontally aligned screws 181 securing the distal ends on clamp 182 to base 172 and also securing base 172 to outer building wall 2b or 4b in FIG. 1 or 2.

The peripheral seam of receiver head 153 in FIG. 11 is located in counter bore recess 172d in FIG. 13, and is secured not only by screw 175 but also between the legs of register 71 and base 172 and in sandwiched relationship between flanges 172f, 173f of base 172 and transparent member 173.

Drive means 176 is specifically shown in FIG. 12. Arm 180 is formed of bent wire, is telescoped at its upper end in bore 179a of plunger 179, has its bottom end bent back upon itself to resiliently engage arm 187a of counter bar 187, and has leg 180a in FIG. 12 laterally bent at a right angle to the plane of the drawing to give spring arm 180 vertical stability. Counter bar 187 is secured to counter shaft 71a to rotate therewith and has in FIG. 11 a plurality of notches 187c in another arm thereof, one of which has one end of tension-type return spring 188 secured therein with the other end of spring 188 secured on the outer housing of register 71 so as to aid in the return action of counter shaft 71a and diaphragm 160 in receiver head 153. Compression-type, conical, spiral, helical spring 189 serves to return plunger 179 and this diaphragm 160 to the FIG. 12 position by engaging plunger head 179b.

Remote meter reading devices 201 and 301 include some common features. Each includes transmitting unit 127 in FIG. 3; signal transmitting element 148 in FIGS. 3, 4, 11 and 12 with receiving head 153; and respectively receiver unit 270 or 370 in FIGS. 14, 15 and 16. Each unit 270 or 370 in FIGS. 14-16 includes base 272 having mounting posts 272a and threaded holes 272b, transparent member 273, securement means 278, screws 274, and securement means 275 having screw 277.

Figure 15:
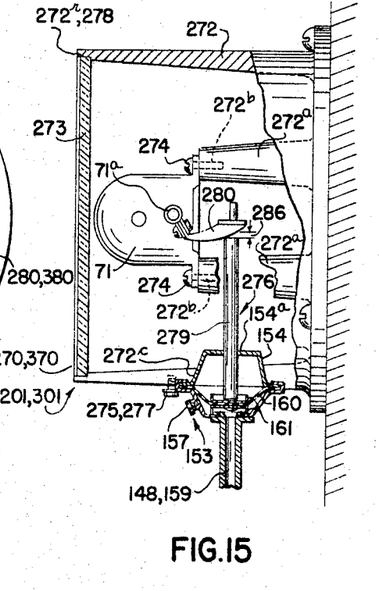
FIG. 15 is a side elevational view, partially cut away in vertical section, of the receiver unit in FIG. 14.
Figures 16, 17:
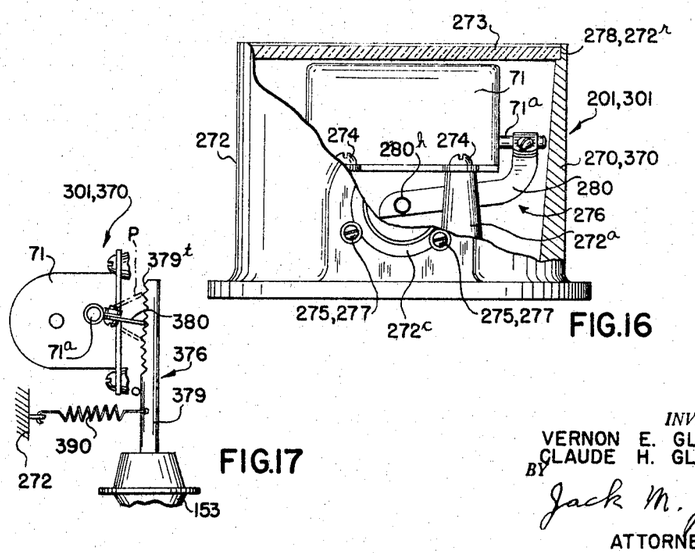
FIG. 16 is a bottom view, partially cut away in horizontal section, of the receiver unit in FIG. 14.
FIG. 17 is a side elevational view of a modified form of counting register driver adapted to be substituted in FIGS. 14–16 for the counting register driver in FIG. 15.

Unit 270 in FIGS. 15 and 16 has drive means 276 including plunger 279, arm 280 and clearance gap 286.

Unit 370 in FIG. 17 has drive means 376, including plunger 379 and arm 380, adapted to be readily substituted in FIGS. 15 and 16 for drive means 276 to form receiver unit 370.

Figure 14:
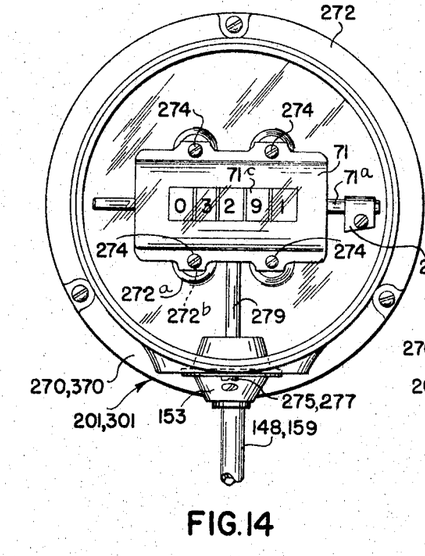
FIG. 14 is a front view of another form of receiver unit adapted to be substituted in the aforesaid one form of device for the receiver unit shown in FIG. 11.

In units 270 and 370, securement means 278 takes the form of transparent member 273 snapped into recess 272r in base 272 and either resiliently or adhesively secured therein.

In units 270 and 370, no return spring for diaphragm 180 in FIG. 15 is required because receiver head 153 is oriented so that diaphragm 180 in head 153 has vertical relative movement, and vertically reciprocable plunger 279 in FIG. 15 or plunger 379 in FIG. 17 rests on top of diaphragms 180 at its lower end. In this construction, the weight of plunger 279 or 379 provides constant pressure on the diaphragm 180 in FIG. 15 for returning this diaphragm in receiver head 153 to its initial position after receipt of a signal through signal transmitting element 148. Also, atmospheric pressure pushes plunger 279 or 379 downwardly to help this return movement. Here, receiver unit 270 or 370 includes in FIGS. 15 and 16 in its housing or base 272 hole 272c in the lower side wall thereof with receiver head 153 of signal transmitting element 148 detachably connected in this hole 272c, located in motion transmitting relationship with respect to counting register 71, and locked in this position by three circumferentally spaced apart screws 277 in securing means 275.

Receiver unit 270 has some suitably modified parts not earlier described. The upper end of flat, leaf-type, spring arm 280, connected to register shaft 71a, has pilot hole 280h loosely receiving and guiding the upper end of plunger 279.

Receiver unit 301 has drive means 376 in FIG. 17 substituted for drive means 276 in FIGS. 14, 15 and 16. Here, plunger 379 has formed on one side thereof ratchet teeth 279t; flat, leaf-type, ratchet pawl arm 380 is secured at one end to counting register shaft 71a and engages with its other end ratchet teeth 379t for actuating register 71; and resilient tension spring 390 is detachably connected at opposite ends to base 272 and plunger 379 for biasing teeth 379t against pawl arm 380. It should be apparent that upward movement of plunger 379 will actuate register 71 and that any necessary escapement, over-travel, upward movement of plunger 379 and teeth 379t (beyond any movement required to actuate register 71 by pawl arm 380) will be permitted by spring 390 permitting disengagement of arm 380 and teeth 379t when arm 380 reaches position P in FIG. 17.

Now, it should be apparent that all devices 101, 201 and 301 operate in generally the same manner. As cam 30 makes one complete rotation in FIG. 3, cam follower 131 reciprocates back and forth, a pulse is carried from diaphragm 160 in transmitting head 152 to diaphragm 160 in receiving head 153, and counter shaft 71a is oscillated through an arc for adding one count to counter 71 in receiver unit 170, 270, or 370 in FIGS. 11, 14, 15, 16 or 17. Hence, each rotation of cam 30 advances counter 71 one unit in count.

FIGS. 18-25 illustrate electrical type remote meter reading devices 401, 501 and 601 including respectively transmitter unit 427; signal transmitting element 448 including signal receiving head or solenoid 453; and receiver units 470, 570 and 670 respectively. Each unit 470, 570 or 670 includes base 472, transparent member 473, securement means 478 having diametrically opposed screws 484 each extending through aligned holes in base 472 and member 473 with one of these holes being threaded, and drive means 476.

In FIGS. 18-21, electrical type remote meter reading device 401 is provided. Water meter volumetric measuring base 7 has mounted thereon transmitter unit 427 in FIGS. 1, 2, 18 and 19 with transmitter unit housing 28 having mounted therein electric switch 432 in FIGS. 19, 20 and 21 periodically opened and closed by cam periphery 30c actuating cam follower or switch arm 431 of switch 432 during rotation of cam 30 for sending from electric power source 426 electrical signals or impulses through signal transmitting element 448 (comprising electrical conductors, signal transmission means, or wires 450 extending from switch 432 through housing bore 28m to receiver unit 470) for actuating therein counting register 71. Switch 432 is thus responsive to the quantity of water measured by wobble plate 13 for periodically transmitting electrical impulses through wires 450 to receiver unit 470.

Switch 432 is preferably of the over-center type so that this switch will have a positive opening and closing action. Switch 432 thus will not send false signals that might otherwise be given by a non-over-center type switch either during switch flutter or if the switch remained closed for any appreciable length of time by cam periphery 30c stopped with its lobe engaging switch arm 431.

The mode of operation of device 401 should be readily apparent after consideration of the electrical circuit in FIG. 21. Power source 426 energizes the circuit. As the lobe on cam periphery 30c closes switch 432, wires 450 energize by power source 426 the solenoid 453 to energize drive means 476, including pulling arm 480 in FIG. 21 counter clockwise about its pivot 480d (secured with solenoid 453 and counter 71 to base 472 of receiver unit 470) against the bias of spring 489 to actuate counter arm 71b. As cam 30 continues to rotate and switch 432 is opened to break the circuit, solenoid 453 is de-energized, spring 489 pulls arm 480 clockwise to the position illustrated in FIG. 21, and counter arm 71b is returned counterclockwise by the spring inside counter 71 to the position illustrated. Hence, each rotation of cam 30 will advance counter 71 one unit in count.

Figure 25:
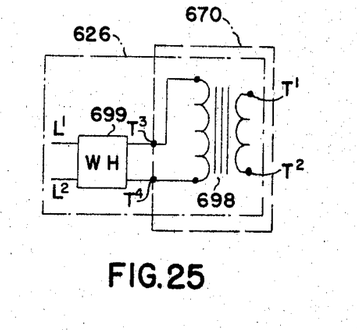

The usual watt-hour meter 699, used by the electric utility in charging the customer, can be mounted on the outside of building side wall 4b beside either receiver unit 470 so that the reading of both electric meter 699 and water meter 6 are located together for convenience of reading both by a single public utility meter reader and for minimizing the damage to the aesthetic appearance of the outside of the building caused by such meters.

Figure 24:
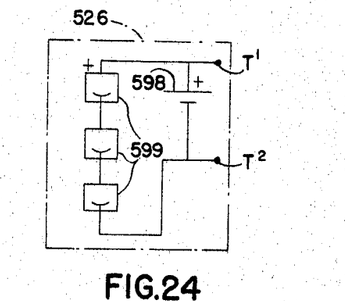
FIGS. 24 and 25 are two different forms of electrical power sources, each adapted to be substituted for the power source generically shown in FIG. 21.

Power source 426 can take any suitable form of electric power, such as replaceable batteries, direct connection to any suitable electric circuit, etc.; but power source 426 preferably takes the form of either power source 526 in FIG. 24 or 626 in FIG. 25 described in more detail hereafter.

Remote meter reading device 501 includes in FIGS. 18-24 transmitter unit 427, transmitting element 448, and receiver unit 570 having power source 526 in FIG. 24 used in FIG. 21 as power source 426 therein. Power source 526 receives its power from the sun by so-called photo cells or sun batteries 599. Here, power source 526 is electrically connected at terminals T1 and T2 in receiver unit 470 in FIG. 21 in place of power source 426 to form receiver unit 570 and includes rechargeable battery or batteries 598 electrically connected in parallel with solar cells 599, also commonly called photo cells or sun batteries, located outdoors and adapted to be struck by sunlight for recharging battery 598. This power source 526 provides in FIG. 22 a base for register 71 in receiver unit 570, secures register 71 to base 472, and uses the principle of energy storage by sun batteries 598, which are able to supply power in the complete absence of light after they have once been exposed to direct sunlight. As shown in FIG. 24, power source 526 comprises one or more solar cells 599, preferably ten in number, connected in series and charging battery 598, known as an HR 01 Yardney silver-zinc secondary cell or the equivalent. With solar cells 599 illuminated in direct sunlight, battery 598 will be trickle charged at a milliamperes rate. Initially, when charging 598 is in a completely discharged state, this charging rate is at a maximum and tapers off as battery 598 becomes charged. Subsequently, in the absence of light, it is not necessary to disconnect solar cell 599 from battery 598 because the dark resistance of solar cells 599 is so high that they do not load battery 598 enough to cause any appreciable drain. Hence, electrical energy is available from source 526 at all times for operation of remote meter reading device 501. No memory mechanism is required to record water usage when electric power fails; no electrical power drain on the household electric source is required.

Any device 101, 201, 301 or 501 thus far described includes a self-contained power source so that the only man-made energy applied thereto is the flow of the water being measured by wobble plate 13 in FIG. 3. The device is not subject to electrical or other power failure. Since it is not electrical, no Underwriters' Laboratory approval is required before installation.

Remote meter reading device 601 includes in FIGS. 18–23 and 25 transmitter unit 427, transmitting element 448, and a receiver unit 670 having power source 626 in FIG. 25 used as source 426 in FIG. 21 for energizing the electric circuit shown in FIG. 21. This source 626 includes conventional watt-hour electric meter 699 in FIGS. 18 and 25 for measuring the electric power supplied by a public utility to building 4 with this meter 699 being mounted on the outside of building 4 beside receiver unit 670 in FIG. 18. An electrical connection is provided at terminals T3 and T4 between electric meter 699 and receiver unit 670 for energizing receiver unit 670, and it is preferred that receiver unit 670 and electric meter 699 abut each other so that no one can cut the electrical connection therebetween in an unauthorized manner to cut off the power to unit 670 so as to de-energize device 601 and thus effect the remote meter reading function. Power source 626 also includes within receiver unit 670 transformer 698 also providing in FIG. 22 a base for counting register 71 and securing register 71 to base 472. This transformer 698 is electrically connected by terminals T1, T2, T3 and T4 between the outside electric power source, provided by electric meter 699, and solenoid 453 in receiver unit 670 for energizing device 601 and for stepping the voltage from electric meter 699 down to the lower control voltage used by device 601. The lower control voltage permits less expensive wiring being used in the control circuit leading from the secondary winding of transformer 698 in FIG. 25 at terminals T1 and T2.

Although device 601 shown in FIGS. 18–23 and 25 is preferable in some installations, it has some outstanding defects so that any device 101, 201, 301 or 501 shown in FIGS. 3–24 is generally preferred. These defects include: (1) the housewife always believes that if she has any high electric bill, it is caused by the electrical operation of device 601 even though it uses very little electricity in one year's time; (2) if the electric current fails to electric meter 699, free water is supplied to the consumer unless a complex, memory, transistory-pick-up, power-failure-engaged escapement, or count storage mechanism is used during the time when power is off to store the count from meter output shaft 25 and to deliver this count to receiver unit 670 after power is restored: and (3) two trade unions are required to install device 601—not only a plumber required to install either device 101, 201 or 301 in FIGS. 3–17 or device 501 in FIGS. 18–24 but both a plumber and an electrician required to install device 601 in FIGS. 18–23 and 25.

Many different variations in form and changes in construction may be made within the scope of the present invention in the aforedescribed transmitting units 127 and 427 and their associated water meter base 7 found in remote meter reading devices 1, 101, 201, 301, 401, 501 and 601. These variations are disclosed hereafter by reference numbers over 800 as six different forms earlier briefly described as found in FIGS. 26, 27, 28–30, 31, 32–34, and 35.

FIG. 26 illustrates modified water meter volumetric measuring base 807 (usable as base 7 in FIG. 3 or 19) having modified housing 812 (similar to housing 12 except where variations are shown), and having a modified form of drive unit 818 (corresponding to drive unit 18) located between head 14a and output shaft 23 in FIG. 3. Since water meters sometimes leak, it is desirable to protect the working mechanism of transmitter unit 127 or 427 from fluid communication with water metering chamber 12a. Here, housing 812 has threaded bore 812a extending vertically therethrough into which are screwed adaptors 815 and 816 having sandwiched therebetween in leakproof relationship diaphragm 817. Shaft 14, driven by water quantity measuring shaft 13a engaging head 14a, is rotatably mounted in screw adaptor 815 and carries thereon one or more driver magnets 819 rotatable about a vertical axis and in a horizontal plane. Shaft 820 is rotatably mounted in screw adapter 816 and carries thereon one or more follower magnets 821 for rotation about a vertical axis and in a horizontal plane. Shafts 14 and 820 are coaxially and vertically aligned with magnets 819 and 821 being rotatable in parallel, horizontal and transverse planes. Rotation of head 14a will correspondingly drive shafts 14 and 820 because each follower magnet 821 is located so as to be synchronously driven by a corresponding driver magnet 819. Diaphragm 817 provides a seal or packing gland between the magnets and between shafts 14 and 820 so as to seal water from water meter chamber 12a against entry into transmitter unit 127 or 427. Shafts 820 and 23 are the respective input and output shafts of speed reduction gear unit 822 providing with gears 24 a 200/1 gear reduction to shaft 25 and providing a drive connecting in FIG. 26 from head 14a to output shaft 23 so that disc 13 and magnets 819 and 821 can easily drive cam 30.

FIG. 27 illustrates modified water meter volumetric measuring base 907 (usable as base 7 in FIG. 3 or 19) having modified housing 912 (similar to housing 12 except where variations are shown), and having a modified form of drive unit 918 between head 14a and shaft 23 in FIG. 3. Here, drive unit 18 in FIG. 3 takes the form of speed reduction gear unit 918 joining input shaft 14 and output shaft 23. Hence, a speed reduction assembly 926, comprising unit 918 and gears 24, directly join shafts 14 and 25.

Water meters are generally read by the meter readers in 100 cubic foot values instead of in the 1 cubic foot value found on the smallest unit dial on the conventional water meter head 8. Therefore, speed reduction gear units 822 and 918 are preferably constructed with a 100/1 reduction ratio, in addition to the reduction in gears 24, so that each rotation of shaft 25 driven thereby measures 100 cubic feet of water and only this 100 cubic feet value is recorded on outside register 71.

Transmitter units 127 and 427 may each include as a housing for cam 30 sitting on and secured to water meter base 7 in place of head 8 any one of several different forms of suitable transmitter unit housings, including:

a. Housing 28 shown in FIGS. 3, 5, 6, 7 and 19 and described in detail heretofore;

b. Assembled together housing 28 in FIGS. 5, 6 and 7 and adaptor 841 in FIGS. 28, 29 and 30 with or without metering head 8 shown in FIG. 31;

c. Housing 928 shown in FIGS. 32, 33 and 34; or d. Assembled together housing 928 and metering head 8 shown in FIG. 35.

These different housings are intended for different purposes. First, housing 28 in FIGS. 3 and 19 is intended to be manufactured at minimum cost and for mass distribution to keep down the cost of devices 1. Second, if it is necessary to check the calibration of any receiver unit 70, 170, 270, 370, 470, 570 or 670 against a standard water meter, test adaptor 841 in FIGS. 28–30 and metering head 8 can be mounted on this inexpensive housing 28, as shown in FIG. 31. Third, if this calibration check is to be required frequently, housing 928 in FIGS. 32, 33 and 34 may be initially provided in each unit 1, 101, 201, 301, 401, 501, or 601 instead of housing 28, even though housing 928 is more expensive than housing 28. Then, if desired, metering head 8 may be assembled directly on base 928, as shown in FIG. 35, without any adaptor being required.

Whenever register metering head 8 is thus used, transmitter unit 127 or 427 having housing 28 or 928 is located between head 8 and base 7 with aligning means, taking the form of suitable screws, holding the aforementioned components assembled and aligned while the dials in head 8 are driven by output shaft 25, as will be described in more detail hereafter.

In each event, standard water meter 6 is disassembled into its components, as earlier described, by removing the screws thereof from threaded holes 7c and holes 8c so that metering head 8 can be removed from volumetric measuring base 7.

Figure 32:
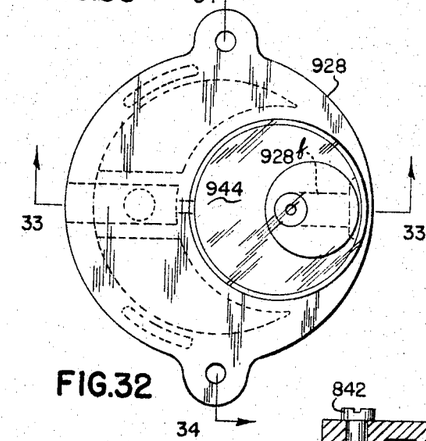
FIG. 32 is a top plan view of a portion of another form of transmitter unit housing, adapted to be substituted for the transmitter unit housing in either FIG. 3 or FIG. 19 but with the cam follower, switch or actuated part omitted therefrom.
Figure 33:
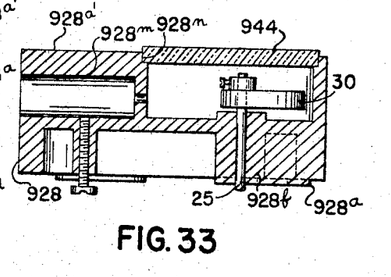
FIGS. 33 and 34 are vertical sectional views taken respectively generally along the lines 33—33 and 34—34 in FIG. 32.

The structure placed on this base 7 in FIG. 3 or 21 may take any of many different forms, as shown by housing 28 in FIGS. 3, 5, 6, 7 and 19; by housing 28 and adaptor 841 in FIGS. 28–31 with head 8; by housing 928 in FIGS. 32–34; and by housing 928 and head 8 in FIG. 35. These structures will be described in this same order hereafter.

Cam actuated follower pin 131 in FIG. 3 and switch 432 in FIG. 19 are not shown in FIGS. 31–35 because any of these housings may be substituted in FIG. 3 or 19 with any of these cam actuated parts put therein. Then, either tube 133 or wires 450 extend out of housing 28 or 928 through bore 28m or 928m.

In FIGS. 28–31, test adaptor 841 and metering head 8 are secured on top of housing 28. Holes 841p in adaptor 841 in FIG. 30 telescope over posts 28p on housing 28 in FIGS. 5 and 6, and circular bore 841n on adaptor 841 telescopes over circular boss 28r around socket 28n on housing 28 so as to detachably secure and to accurately locate adaptor 841 to housing 28. To install test adaptor 841 on standard water meter 6, the user lifts metering head 8, and then sequentially drops into place transmitter unit housing 28, test adaptor 841 and metering head 8 so that housing 28 and adaptor 841 are now sandwiched between head 8 and water meter base 7. The component parts are easily coupled together because adaptor 841 has on its top surface in FIGS. 29 and 31 connector 841a, similar to connector 7a, having a female recess 841d telescopically receiving male alignment ring 8d of head connector 8a on metering head 8 so that longer screws 842 in FIG. 31, or other aligning means, can be passed downwardly through aligned holes 8c, 28c and 7c to pull the parts axially into assembled position. Adaptor 841 has on its top surface (remote from housing 28) this adaptor connector 841a, similar to base connector 7a, for securing thereon metering head 8 in the same way by head connector 8a. Hence, the user can either use this assembly in FIG. 31 to read for test purposes the volume of water measured or use only housing 28 in FIG. 3 or 19 so that transmitter unit 127 or 427 has minimum size.

In FIGS. 32–35, one-piece transmitter unit housing 928 is provided and generally includes the exterior, and some of the component, structural features of coupled housing 28 and adaptor 841. Housing 928 has on its bottom surface connector 928a for connecting it to base 7 with or without head 8, as shown respetively in FIGS. 35 and 34. This connector 928a includes male alignment ring 928d at the bottom of housing 928 telescoped into female recess 7d, and diametrically aligned ears 928b with each ear having hole 928c therein through which may pass one of the screws 842 (from FIG. 31) to screw into one of the threaded holes 7c in base 7. The top surface of housing 928, located remote from base 7, is generally flat not only to provide a finished appearance to housing 928 when used without head 8 but also to serve as connector 928a' for securement directly to connector 8a. Head 8 is easily secured and aligned thereon by alignment of ear holes 8c, 928c and 7c in the assembled position and screwing in screws 842, as partially shown in FIG. 35. Hence, the user can easily convert standard water meter 6 to the construction shown in FIG. 34 or 35 by removing head 8 and then by placing on base 7 either housing 928 in FIG. 34 or housing 928 and head 8 in FIG. 35 before inserting and tightening screws 842. The construction in FIG. 24 provides a finished appearance to water meter 6. If meter reading is desired inside the house, metering head 8 can be used, as shown in FIG. 35. If such meter reading is not desired, head 8 can be omitted, as shown in FIGS. 32–34.

Each of the FIGS. 31 and 35 also includes drive coupling 843 drivingly connecting the dials in metering head 8 to shaft 25. Coupling 843 includes respectively driver sleeve 843a telescopically connected over cam hub 30a with an axial slot in sleeve 843a telescoped over set screw 30b of cam 30 so that set screw 30b serves as a driving key. Coupling 843 is connected to meter head shaft 8f to rotate this shaft and to drive the dials in associated metering head 8.

The constructions in FIGS. 3, 19, 32, 33 and 34 have features in common. Each has respectively in housing 28 or 928 a hole or socket 28n or 928n located over signal generating cam 30 and into which transparent window or crystal 144, 444 or 944 may be snapped and sealed so as to permit the user or meter reading man not only to check visually that cam 30 is driving properly but also to count the quantity of water being used by counting the number of rotations of cam 30 for a check against the reading on the associated receiver unit 70, 170, 270, 370, 470, 570 or 670. This window 44, 144 or 944 may be removed when metering head 8 is installed thereon in FIG. 31 or 35.

Housings 28 and 928 and water meter base 7 can be altered, if desired. First, O-ring seals may be placed in an annular seat between female recess 7d and male alignment ring 28d or 928d and in an annular seat between bore 28m or 928m and tube 133 or wires 450 to seal against outside water leakage into transmitter unit 127 or 427 and water meter base 7 if this assembly is submerged under mud or water, a location that a water meter must sometimes assume. Expensive hermetic sealing of this assembly is not required. Second, housings 28 and 928 may be easily altered to fit a wide variety of standard water meters 6. These housings are preferably formed as injection type plastic moldings. Since different meters 6 have shaft 25 located in different locations, bosses 28f and 928f in FIGS. 3, 7 and 19 and in FIG. 33 have been provided with adequate stock to permit drilling the hole for shaft 25 at any desired radial location therein corresponding to the location of that shaft in the standard water meter to be used.

Each device 101, 201, 301, 401, 501 and 601 is easily sealed to prevent unauthorized tampering after being assembled and installed. A wire is passed in a conventional manner through the holes in the heads of the screws passing through holes 7c, 8c, 28c and/or 928c; and the ends of this wire are locked together by a lead seal to seal any transmitter unit 127 or 427. In FIG. 11, circumferential V-clamp 183 secures together circumferential flanges 172f and 173f respectively on base 172 and cover member 173 by tangential clamp screw 184 suitably sealed against removal in the same manner by a lead seal to seal receiver unit 170. Bleed-screws 157 in FIGS. 4, 12 and 15; screws 277 in FIGS. 14, 15 and 16; and screws 484 in FIGS. 18, 22 and 23 may also be suitably cemented in place and sealed in the same manner by the same type conventional wire seal lock after assembly.

The invention disclosed herein may be embodied in other specific forms without departing from the spirit or essential characteristics thereof. The present embodiments are therefore to be considered in all respects as illustrative and not restrictive with the scope of the invention being indicated by the appended claims rather than by the aforegoing description, and all changes which come within the meaning and range of equivalency of the claims are therefore intended to be embraced therein.

What is claimed and desired to be secured by U.S. Letters Patent is:

1. A remote meter reading device, comprising
  (a) a transmitter unit including an actuating member movably responsive to and generally proportional to a quantity measured,
  (b) a receiver unit including a counting register, and
  (c) a signal transmitting element connecting the transmitter unit and the receiving unit,
  (d) said transmitter unit including a signal transmission means for transmitting in response to movement of said actuating member a signal from said transmitter unit to said register for recording on said register the total quantity measured,
  (e) said actuating member being a rotatable drive shaft, and
  (f) a fluid meter volumetric measuring base and base connector thereon,
  (g) said measuring base usually having a metering head joined thereto by a base connector and head connector respectively thereon, such as found in a water meter,
  (h) said transmitter unit having a transmitter unit housing sitting on and secured to said base connector in place of said head,
  (i) said transmitter unit housing having a surface located remote from said base and shaped differently than said base connector.

2. A remote meter reading device, comprising
  (a) a transmitter unit including an actuating member movably responsive to and generally proportional to a quantity measured,
  (b) a receiver unit including a counting register, and
  (c) a signal transmitting element connecting the transmitter unit and the receiving unit,
  (d) said transmitter unit including a signal transmission means for transmitting in response to movement of said actuating member a signal from said transmitter unit to said register for recording on said register the total quantity measured,
  (e) said actuating member being a rotatable drive shaft,
  (f) a fluid meter volumetric measuring base and base connector thereon,
  (g) said measuring base usually having a metering head joined thereto by a base connector and head connector respectively thereon, such as found in a water meter,
  (h) said transmitter unit having a transmitter unit housing sitting on and secured to said base connector in place of said head,
  (i) a signal generating cam on said transmitter unit drive shaft, and
  (j) a transparent window in a socket in said transmitter unit housing located over said cam to permit visual inspection of rotation of said cam.

3. A remote meter reading device, comprising
  (a) a transmitter unit including an actuating member movably responsive to and generally proportional to a quantity measured,
  (b) a receiver unit including a counting register, and
  (c) a signal transmitting element connecting the transmitter unit and the receiving unit,
  (d) said transmitter unit including a signal transmission means for transmitting in response to movement of said actuating member a signal from said transmitter unit to said register for recording on said register the total quantity measured,
  (e) said actuating member being a rotatable drive shaft,
  (f) a fluid meter volumetric measuring base and base connector thereon,
  (g) said measuring base usually having a metering head joined thereto by a base connector and head connector respectively thereon, such as found in a water meter,
  (h) said transmitter unit having a transmitter unit housing sitting on and secured to said base connector in place of said head,
  (i) a signal generating cam on said transmitter unit drive shaft,
  (j) a socket in said transmitter unit housing located over said cam, and
  (k) a test adapter securable to said transmitter unit housing over a boss around said socket remote from said base,
  (l) said adapter having on its surface remote from said transmitter unit housing an adapter connector similar to said base connector for securing thereon said meter head by said head connector, whereby a user of this assembly can either use said transmitter unit housing adapter, and metering head on said measuring base to read for test purposes the volume of water measured or use said transmitter unit housing on said measuring base without said adapter and metering head so that said assembly has minimum size.

4. An assembly, as set forth in claim 3, with
  (a) said metering head being secured by said head connector to the adapter connector on said adapter, and
  (b) a drive coupling drivingly connecting said shaft to said metering head.

5. A remote meter reading device, comprising
  (a) a transmitter unit including an actuating member movably responsive to and generally proportional to a quantity measured,
  (b) a receiver unit including a counting register, and
  (c) a signal transmitting element connecting the transmitter unit and the receiving unit,
  (d) said transmitter unit including a signal transmission means for transmitting in response to movement of said actuating member a signal from said transmitter unit to said register for recording on said register the total quantity measured,
  (e) said receiver unit including drive means operatively connecting said transmitting element and the counting register in said receiver unit,
  (f) said drive means including resilient means operatively connected in the register driving connection between the transmitting element and register for yielding in response to over-travel of said signal beyond the signal required to actuate said register without overdriving said register.

6. A remote meter reading device, comprising
  (a) a transmitter unit including an actuating member movably responsive to and generally proportional to a quantity measured,
  (b) a receiver unit including a counting register, and (c) a signal transmitting element connecting the transmitter unit and the receiving unit,
(d) said transmitter unit including a signal transmission means for transmitting in response to movement of said actuating member a signal from said transmitter unit to said register for recording on said register the total quantity measured,
(e) said signal transmitting element including
   (1) a tube,
   (2) signal transmitting means movable endwise in said tube responsive to movement of said actuating member for actuating said register,
   (3) a transmitting head at one end of said tube for receiving a signal from said transmitter unit, and
   (4) a receiver head at the other end of said tube for transmitting a signal for actuating said counting register,
   (5) said signal transmitting means operatively connecting said heads for transmitting said signal from said transmitting head to said receiver head,
(f) said receiver head having a diaphragm oriented to have vertical relative movement, and
(g) said receiver unit including a vertically reciprocable plunger of uniform weight exerting a constant force and engaging on one end against the top of said diaphragm in said receiver head and operatively connected for actuating said counting register,
whereby the weight of said plunger provides a constant pressure on said receiver head diaphragm for returning said receiver head diaphragm after receipt of a signal through said transmitting element.

7. A device, as set forth in claim 6, with
(a) said receiver unit including a housing having a hole in the lower side wall thereof,
(b) the receiver unit end of said signal transmitting element being detachably connected to said receiver unit and being located in said hole with said receiver head located in motion transmitting relationship with respect to said counting register.

8. A device, as set forth in claim 6, with
(a) ratchet teeth on the side of said plunger,
(b) a ratchet pawl operatively connected to said register for actuating said register, and
(c) resilient means biasing together said teeth and said pawl and permitting any necessary over-travel movement of said teeth beyond movement required to actuate said register by said pawl and allowing for any thermal expansion of said signal transmitting means.

9. A remote meter reading device, comprising
(a) a transmitter unit including an actuating member movably responsive to and generally proportional to a quantity measured,
(b) a receiver unit including a counting register, and
(c) a signal transmitting element connecting the transmitter unit and the receiving unit,
(d) said transmitter unit including a signal transmission means for transmitting in response to movement of said actuating member a signal from said transmitter unit to said register for recording on said register the total quantity measured,
(e) said signal transmitting element including
   (1) a tube,
   (2) signal transmitting means movable endwise in said tube responsive to movement of said actuating member for actuating said register,
(f) said transmitter unit including means for adjustably counterbalancing the static-head pressure of the weight of said signal transmission means in said tube, so that movement of said actuating member in said transmitter unit does not have to work against head pressure of said signal transmitting means whenever said receiver unit is located higher than said transmitter unit.

10. A device, as set forth in claim 9, with
(a) said adjustable counterbalancing means including a spring associated with said actuating member of said transmitter unit and said signal transmission means, and
(b) means for adjusting the counterbalancing force exerted by said spring on said signal transmission means.

11. A device, as set forth in claim 9, with
(a) said adjustable counterbalancing means including
   (1) a spring member, and
   (2) a pin member,
   (3) one of said members being provided in two different lengths and being usable with the other of said members for counterbalancing two different head pressures, and
(b) said signal transmitting element and transmitter unit being connected by an axially adjustable telescopic connection,
whereby differences in length of said one member or in the required counterbalancing force may be suitably compensated for.

12. A remote meter reading device, comprising
(a) a transmitter unit including an actuating member movably responsive to and generally proportional to a quantity measured,
(b) a receiver unit including a counting register,
(c) a signal transmitting element connecting the transmitter unit and the receiving unit,
(d) said transmitter unit including a signal transmission means for transmitting in response to movement of said actuating member a signal from said transmitter unit to said register for recording on said register the total quantity measured,
(e) said signal transmitting element including
   (1) a tube, and
   (2) signal transmitting means movable endwise in said tube responsive to movement of said actuating member for actuating said register,
(f) said signal transmission means being a column of liquid located within said tube, and
(g) a drive means operatively connecting said liquid and register and including a thermal expansion and contraction compensating means operable so that the register will always accurately record the quantity measured in spite of large variations of temperature of said liquid.

13. A device, as set forth in claim 12, with
(a) said liquid being hermetically sealed within said tube, and
(b) said liquid being a non-freezing liquid having minimum thermal expansion and including ethylene glycol as its anti-freezing component.

14. A remote meter reading device, comprising
(a) a transmitter unit including an actuating member movably responsive to and generally proportional to a quantity measured,
(b) a receiver unit including a counting register,
(c) a signal transmitting element connecting the transmitter unit and the receiving unit,
(d) said transmitter unit including a signal transmission means for transmitting in response to movement of said actuating member a signal from said transmitter unit to said register for recording on said register the total quantity measured,
(e) said signal transmitting element including
   (1) a tube, and
   (2) signal transmitting means movable endwise in said tube responsive to movement of said actuating member for actuating said register,
(f) said signal transmission means being a column of liquid located within said tube,
(g) said tube being a metal tube, and
(h) a rubber tube connecting one of said units and said metal tube,
(i) said rubber tube being formed of a self-sealing, soft rubber, whereby said liquid may be inserted into said metal tube by inserting a hypodermic needle with said liquid into said soft rubber, inserting liquid into said tube by said needle, and subsequently withdrawing said needle so that the soft rubber seals the hole previously formed in said rubber tube by said needle.

15. A remote meter reading device, comprising
  (a) a transmitter unit including an actuating member movably responsive to and generally proportional to a quantity measured,
  (b) a receiver unit including a counting register, and
  (c) a signal transmitting element connecting the transmitter unit and the receiving unit,
  (d) said transmitter unit including a signal transmission means for transmitting in response to movement of said actuating member a signal from said transmitter unit to said register for recording on said register the total quantity measured,
  (e) said signal transmitting element including
    (1) a tube, and
    (2) signal transmitting means movable endwise in said tube responsive to movement of said actuating member for actuating said register,
  (f) said signal transmission means being a column of liquid located within said tube, and
  (g) a bleed screw located at each end of said tube adjacent to the respective unit,
whereby a solid hydraulic column of liquid can be located in said tube without gas being entrapped therein.

16. A device, as set forth in claim 15, with
  (a) one of said units being located below the other of said units,
whereby said tube is easily filled with a solid and accurately measured liquid column to proper level by opening the bleed screws at both of said units, inserting liquid into said tube until it begins to flow out the lower bleed screw, closing the lower bleed screw after the gas is exhausted from said tube, continuing to fill the tube with liquid until it begins to flow out at the bleed screw at the upper of said units so as to measure accurately the amount of liquid in said tube, and closing the bleed screw at the upper of said units so as to seal hermetically the liquid in said tube.

17. A remote meter reading device, comprising
  (a) a transmitter unit including an actuating member movably responsive to and generally proportional to a quantity measured,
  (b) a receiver unit including a counting register, and
  (c) a signal transmitting element connecting the transmitter unit and the receiving unit,
  (d) said transmitter unit including a signal transmission means for transmitting in response to movement of said actuating member a signal from said transmitter unit to said register for recording on said register the total quantity measured,
  (e) said signal transmitting element including
    (1) a tube, and
    (2) signal transmitting means movable endwise in said tube responsive to movement of said actuating member for actuating said register,
  (f) said signal transmission means being a column of liquid located within said tube,
  (g) said column of liquid being generally incompressible, and
  (h) a drive means operatively connecting said liquid and register and rigid in the register driving direction during driving of said register.

References Cited by the Examiner
UNITED STATES PATENTS

| | | | |
|---|---|---|---|
| Re. 23,800 | 3/1954 | Dufour | 73—272 X |
| 2,553,842 | 5/1951 | Bickel et al. | 73—272 |
| 2,553,843 | 5/1951 | Bickel et al. | |
| 2,858,982 | 11/1958 | Greenwood et al. | 235—91.8 |
| 2,991,652 | 7/1961 | Bassett | 73—272 X |
| 3,156,115 | 11/1964 | Adelmann | 73—272 |
| 3,158,025 | 11/1964 | Colatrella et al. | 73—272 |

RICHARD C. QUEISSER, *Primary Examiner.*

DAVID SCHONBERG, *Examiner.*

EDWARD D. GILHOOLY, *Assistant Examiner.*